M. B. SHERMAN.
RASPBERRY CLEANER.
APPLICATION FILED AUG. 3, 1908.
921,291.
Patented May 11, 1909.
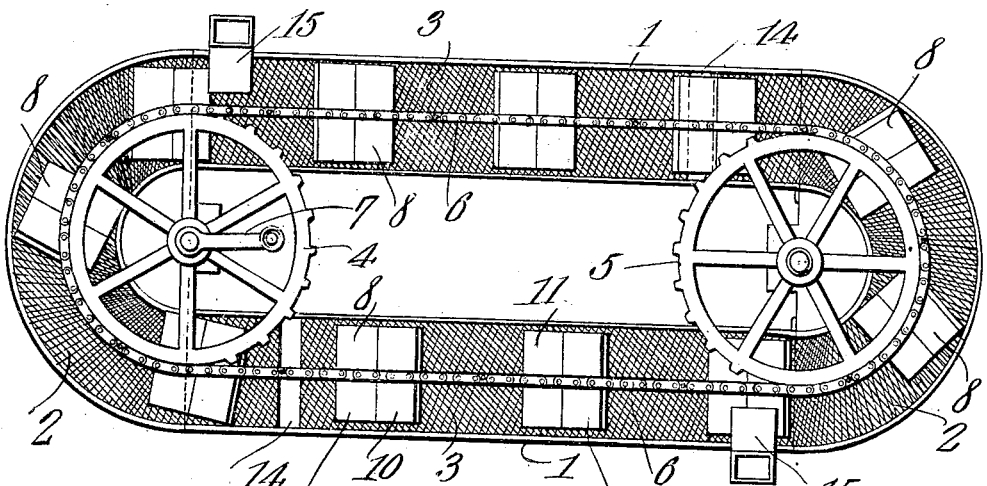
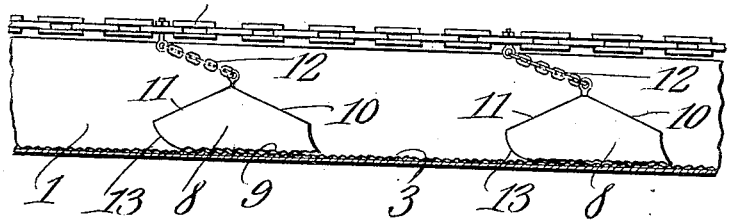
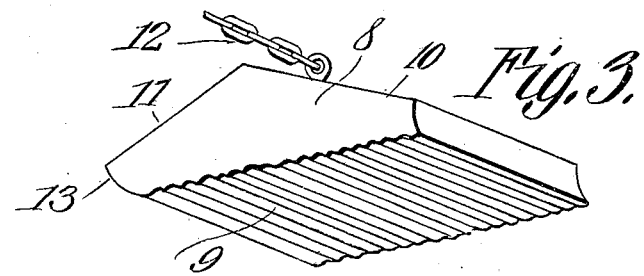
Witnesses
Inventor
Marinus B. Sherman.
By C. A. Snow & Co.,
Attorneys

UNITED STATES PATENT OFFICE.

MARINUS B. SHERMAN, OF PAYETTE, IDAHO.

RASPBERRY-CLEANER.

No. 921,291.      Specification of Letters Patent.      Patented May 11, 1909.

Application filed August 3, 1908. Serial No. 446,705.

*To all whom it may concern:*

Be it known that I, MARINUS B. SHERMAN, a citizen of the United States, residing at Payette, in the county of Canyon and State of Idaho, have invented a new and useful Raspberry-Cleaner, of which the following is a specification.

This invention has relation to devices for removing stems from dried raspberries and the like and it consists in the novel construction and arrangement of its parts as hereinafter shown and described.

It frequently happens that when dried raspberries and similar berries are harvested that thorny stems are gathered with the same and that the said stems adhere to the berries and it is the object of the present invention to provide a simple means for removing such thorny stems from the berries without injuring the fruit.

With this object in view the device consists of a trough-shaped receptacle or a series of such receptacles having roughened bottoms. A series of rubbers are arranged to operate over the roughened bottoms of the troughs and means is provided for actuating or moving the said rubbers. The said rubbers are provided as above indicated with roughened under sides and the roughened sides are provided with slanting or sloping surfaces. The fruit with the adhering stems is poured into the troughs upon the slanting or sloping sides of the rubber and from the said slanting or sloping sides the fruit falls upon the roughened surfaces of the trough and is spread or distributed. During the movement of the said rubbers the fruit is successively operated upon and the stems are broken or ruptured to such an extent that they dislodge from the berries and may eventually be separated from the same by a fan or other suitable mechanism.

In the accompanying drawing; Figure 1 is a plan view of the cleaner. Fig. 2 is a sectional view of a portion of the same, and Fig. 3 is a perspective view of one of the rubbers used in the cleaner.

The device consists of a trough 1 or a series of troughs 1 which may be connected together at their ends with semicircular sections 2. The said troughs 1 and the sections 2 are provided upon their bottoms with coarse or rough material such as canvas 3. The sprocket wheels 4 and 5 are journaled for rotation at the ends of the troughs 1 or over the trough sections 2 and the sprocket chain 6 is arranged to pass around the said sprocket wheels 4 and 5. The sprocket wheel 4 may be rotated by means of a handle 7 or its equivalent. The diameter of the wheels 4 and 5 is such as to cause the sprocket chain 6 to travel over the middles of the troughs 1. The rubbers 8 are of special construction and are provided at their under sides with the roughened surfaces 9. The said rubbers are provided at their upper sides with the surfaces 10 and 11, the first mentioned of which are rearwardly inclined and the last mentioned are forwardly inclined. The flexible members 12 connect the rubbers 8 with the sprocket chain 6, and the under forward ends of the rubbers 8 are cut away as at 13. Each of the troughs 1 is provided at or near its end with an outlet 14 and a chute 15 is disposed over the forward end portion of each of the said troughs.

The operation of the apparatus is as follows. The sprocket wheel 4 is rotated and the sprocket chain 6 moves in an orbit around the wheels 4 and 5 and longitudinally along the troughs 1, and the trough sections 2. The said chain 6 carries with it the rubbers 8 which move over the roughened surfaces of the said troughs and trough sections. At the same time the fruit with the adhering stems is passed into the troughs 1 through the chutes 15 and as the fruit falls upon the sloped or inclined surfaces 10 and 11 of the rubbers 8 it is spread and distributed and falls upon the roughened surfaces of the troughs 1. When the fruit is lodged upon the rough surfaces of the said troughs 1 the rubbers pass over the fruit and roll or mill the fruit along the surfaces 3 which action upon the fruit has a tendency to break and loosen the stems without injury to the berries. When the fruit arrives at the outlet 14 the berries and the stems have been separated or disunited from each other and the stems and berries fall through the outlet 14 and the stems may be removed from the berries by fans or similar devices. By reason of the fact that the rubbers 8 are connected with the sprocket chain 6 by means of the flexible members 12 the said rubbers may ride over the berries without unduly crushing or mutilating the berries as the said rubbers are not positively held against vertical movement.

Having described my invention what I claim as new and desire to secure by Letters Patent is:—

A device for stemming berries comprising an elliptical-shaped, rough-bottom trough having discharge openings, a flexible member on sprocket wheels arranged to move longitudinally along the trough, a trailing flexible member attached to the first flexible member, a rubber attached to said trailing flexible member and having a rough under side adapted to operate over the rough bottom of the trough and to bear with its full weight upon the contents thereof, and means on one of the sprocket wheels for operating the said device.

In testimony that I claim the foregoing as my own, I have hereto affixed my signature in the presence of two witnesses.

MARINUS B. SHERMAN.

Witnesses:
A. N. SOLISS,
JAS. A. LACKEY.